May 9, 1933. A. H. BOILEAU 1,907,486

AERATING MEANS FOR FREEZERS AND THE LIKE

Filed Aug. 13, 1931

Witness:
William P. Kilroy

Inventor:
Arthur H. Boileau
Wm. D. Bell
Atty.

Patented May 9, 1933

1,907,486

UNITED STATES PATENT OFFICE

ARTHUR H. BOILEAU, OF CEDAR RAPIDS, IOWA, ASSIGNOR TO CHERRY-BURRELL CORPORATION, OF WILMINGTON, DELAWARE, A CORPORATION OF DELAWARE

AERATING MEANS FOR FREEZERS AND THE LIKE

Application filed August 13, 1931. Serial No. 556,930.

This invention relates to the manufacture of ice cream or the like and it has for its object broadly to withdraw the ice cream mixture from a supply, to add a determined quantity of a fluid such as air to the mixture, and to deliver the air and mixture to a freezer or other converting means.

It has been the practice heretofore to prepare an ice cream mixture, for example, and pour it into the supply receptacle of a freezer and then to deliver it into a chamber of the freezer wherein it is aerated and frozen or prepared for the hardening step in the manufacturing process. Sometimes a piston pump has been used to withdraw the mixture from the supply and force it into the freezer or other converting means and another piston pump, in parallel with the first pump, has been used to force air into the mixture and freezer. These pumps may operate satisfactorily so long as the valves therein operate in proper timed relation but it is difficult to obtain properly timed operation of the valves.

Another object of the invention is to use rotary pumps to withdraw an ice cream mixture from the supply and to add air to this mixture and to subsequently force the air and mixture to a freezer or other converting means. By using rotary pumps the difficulties encountered in timing the operation of the valves of piston pumps is overcome.

A still further object is to provide the feed line from the supply to the freezer with two pumps, connected in series, one pump metering the flow of the mixture and the other pump operating at a higher speed than the metering pump and having an inlet for a fluid to be added to the mixture flowing from the metering pump so that the second pump will force the mixture and fluid to the freezer or other converting means wherein the fluid and mixture may be thoroughly intermingled to produce a desired yield.

In the selected embodiment of the invention illustrated in the accompanying drawing Fig. 1 is an elevation;

Figure 1:
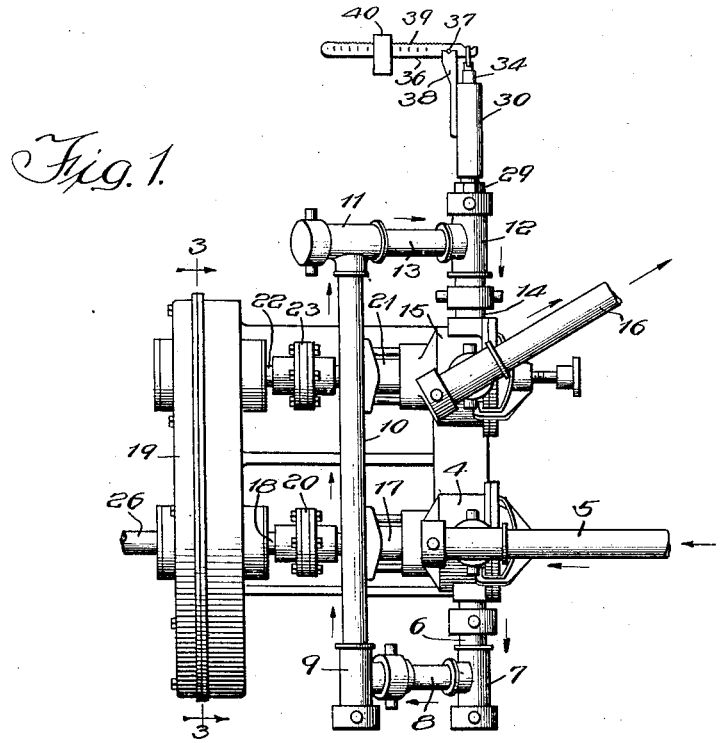

In the form of the invention shown in the drawing, 4 is a rotary pump having an inlet 5 connected to a storage tank or other source of supply of the material. The pump 4 withdraws the material from the supply and discharges it through a pipe 6, a fitting 7, a pipe 8, a fitting 9, a pipe 10, a fitting 11, a pipe 13, and a T-fitting 12. A pipe 14 connects the fitting 12 to the inlet of a rotary pump 15, which may be of the same kind and preferably of the same capacity, as the pump 4. The pumps 4 and 15 are thus connected in series. The pump 15 discharges through a pipe 16 to a freezer or other device wherein the ice cream mixture, or other material, and a fluid, admitted to the material as will be described, are thoroughly intermixed and converted into final form preparatory for the hardening step in the manufacturing process or for any other desired purpose. In the manufacture of ice cream, the pump 15 may discharge into a continuous freezer or the like as set forth in my co-pending application, Serial No. 551,599, filed July 18, 1931. The pump 4 operates as a metering and supply pump and the pump 15 operates as a mixing and discharge pump. The pump 15 operates at a higher rate of speed than the pump 4 and since the supply of mixture for the pump 15 is controlled by the pump 4, the pump 15 will be starved and provision is made for the inlet of a fluid to the pump 15 wherein the fluid and the ice cream mixture are intermingled to be discharged through pipe 16.

Figure 3:
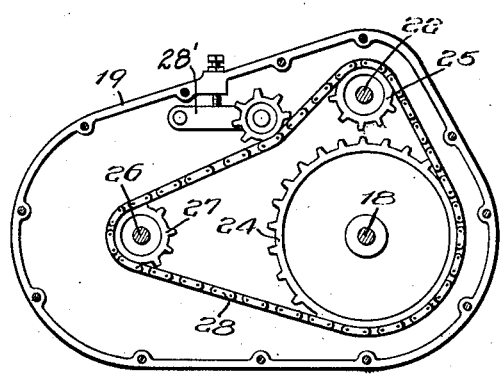
Fig. 3 is a sectional detail view on the line 3—3 of Fig. 1.

I provide a common drive to operate the pumps in a predetermined ratio. The drive shaft 17 of pump 4 is connected by a coupling 20 to a shaft 18 journaled in the housing 19 (Fig. 3). The drive shaft 21 is connected by a coupling 23 to a shaft 22 journaled in the housing 19. A sprocket 24 is fast on the shaft 18 and a sprocket 25 is fast on the shaft 22 within said housing. The ratio between the sprockets 24 and 25 corresponds to the desired ratio of operation between the pumps 4 and 15. A drive shaft 26 is journaled in the housing 19 and has a sprocket 27 fast thereon within said housing. The sprockets 24 and 25 are driven from the sprocket 27 by an endless chain 28 which is maintained taut by a suitable tightening device 28'.

Figure 2:
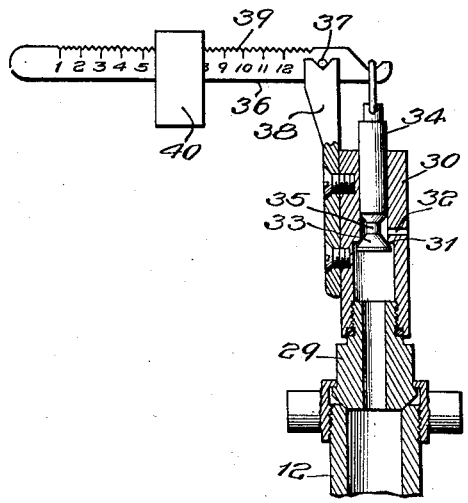
Fig. 2 is an enlarged sectional view of the fluid control valve.

A pipe coupling 29 connects a valve housing 30 to the T-fitting 12 (Fig. 2); and this valve housing is provided with a valve seat 31 between the fluid inlet 32 and the outlet of the housing. A valve 33 has a stem 34 which operates in a bore extending through the housing and a reduced portion 35 is provided on the stem immediately above the valve 33. The end of the valve stem projecting through the end of the housing is connected to one end of a valve lever 36 fulcrumed at 37 on bracket 38 carried by valve housing 30. The upper edge of the balance lever 36 is serrated at 39 to hold a counterweight 40 in adjusted position on the lever. Since the pump 15 operates at a higher rate of speed than the pump 4 and as the quantity of material discharged by the pump 4 to the pump 15 is determined, it is apparent that the pump 15 is starved and thus by providing a fluid inlet intermediate the pumps 4 and 15, the pump 15 will draw in air or other fluid to be intermingled with the mixture passing from the pump 4, the speed of operation of the pump 15 broadly regulating the quantity of air so drawn into the system. To provide a fine adjustment for the quantity of air to thereby regulate the yield of the product discharged from the freezer or other converting means, the counterweight is positioned along the balance lever in adjusted positions to control movement of the valve 33, and this valve controls the inlet of air. Calibrations are associated with the serrations to facilitate positioning of the counterweight along the balance lever.

In practice, power is supplied to the shaft 26 and the pumps will be operated in a predetermined ratio, the pump 15 operating at a higher rate of speed than the pump 4 which will withdraw a predetermined quantity of the mixture from the supply through the pipe 5 and discharge it through the pump interconnecting or conducting means into pump 15 which also receives air through the fluid inlet and operates not only to force the material through the pipe 16 to a freezer or other converting means but also operates to intermingle the air and mixture before it is delivered to the freezer or converting means. As before stated, the pump 15 is operated at a higher rate of speed than the pump 4 and as the pump 4 determines the quantity of mixture supplied to the pump 15, the latter pump will be starved and tend to produce a partial vacuum in the interconnecting means. This will cause the valve 33 to open and admit air or other fluid, for example carbon dioxide, through the inlet 32 to the pump 15, the quantity of air admitted being determined by the position of the counter-weight 40 on the balance lever. The mixture will be intermingled in the pump 15 with the air admitted through inlet 32 and the quantity of air admitted to the pump is determined in desired ratio to the quantity of mixture received from the pump 4 so that proper portions of mixture and air may be mixed in the pump and delivered to the freezer to produce a superior product of the desired yield.

The invention provides a novel and efficient method and means for admitting a fluid to a material, such as an ice cream mix or the like, during the passage of the mixture from a supply to a freezer or other converting means. By admitting the fluid to the mixture before it is delivered to the freezer or other converting means, I produce a mixture of superior quality for the freezer or other converting means wherein the intermingled mixture and air may be beaten or whipped to produce a superior product of a desired yield characterized by uniformity and smoothness in texture. Since one pump meters the quantity of the mixture and the other pump draws in a definite amount of fluid for intermingling with the mixture and since this last pump discharges against the head in the freezer or other converting means, the mixture will be delivered in a uniform condition mixed with a predetermined quantity of fluid, which quantity is predetermined by the ratio of the pumps and the position of the counterweight on the balance lever.

I have shown and described a selected embodiment of my invention which may be used in connection with an ice cream freezer, but the invention is capable of other uses and may be embodied in other forms and I reserve the right to make any changes in form, construction, and arrangement of parts that may be necessary or desirable in adapting the invention for different uses and installations, within the scope of the following claims.

I claim:

1. In a device of the class described, the combination of an inlet connection and an outlet connection, a pump line intermediate said connections, pump means in said pump line for causing a flow of material from the inlet connection to the outlet connection, means in series with pump means and adapted to admit a fluid to the material and to force the fluid and material through the outlet connection, and means for so operating the pump means that the quantity of material flowing from said pump means is less than the capacity of the means in series with the pump means.

2. In a device of the class described, the combination of an inlet connection and an outlet connection, a pump line intermediate said connections, a pump in said pump line for causing a flow of material from the inlet connection, another pump in said pump line and receiving the material from the first pump and adapted to admit a fluid to said material and to force said fluid and mixture through the outlet connection, and means for so operating said pumps that the quantity of material flowing from the first pump is less than the capacity of the second pump.

3. In a device of the class described, the combination of an inlet connection and an outlet connection, a pump line intermediate said connections, a pump in said pump line for withdrawing a metered quantity of material through the inlet connection, another pump in said pump line receiving the metered quantity of material from the first pump and adapted to admit fluid to the material and to intermingle and force the fluid and material through the outlet connection, and means for so operating said pumps that the quantity of material flowing from the first pump is less than the capacity of the second pump.

4. In a device of the class described, the combination of an inlet connection and an outlet connection, a pump line intermediate said connections, a pump in said pump line for causing a flow of a metered quantity of material from the inlet connection toward the outlet connection, and another pump in series with the first pump and operating at a higher rate of speed than said first pump and adapted to admit a fluid to the material during the flow thereof.

5. In a device of the class described, the combination of an inlet connection and an outlet connection, a pump line intermediate said connections, a rotary pump in said pump line for causing a flow of material from the inlet connection toward the outlet connection, another rotary pump in said pump line in series with the first pump and adapted to admit a fluid to said material and to force said fluid and material through the outlet connection, and means for so operating said rotary pumps that the quantity of material flowing from the first pump is less than the capacity of the second pump.

6. In a device of the class described, the combination of an inlet connection and an outlet connection, a pump line intermediate said connections, a rotary pump in said pump line for causing a flow of material from the inlet connection toward the outlet connection, another rotary pump in said pump line in series with the first pump and adapted to admit a fluid to the material and to force said fluid and material through the outlet connection, and means operating the second rotary pump at a higher rate of speed than the first rotary pump.

7. In a device of the class described, the combination of an inlet connection and an outlet connection, a pump line intermediate said connections, a rotary pump in said pump line for causing a flow of material from the inlet connection toward the outlet connection, another rotary pump in said pump line in series with the first pump and adapted to admit a fluid to said material and to force said fluid and material through the outlet connection, and means operating said pumps in a predetermined ratio whereby the second pump is operated at a higher rate of speed than the first pump.

8. In a device of the class described, the combination of an inlet connection and an outlet connection, a pump line intermediate said connections, a pump in said pump line for causing a flow of a metered quantity of material from the inlet connection to the outlet connection, another pump in series with said first pump to receive the metered quantity of material from said first pump, means for so operating the pumps that the quantity of material flowing from the first pump is less than the capacity of the second pump, means intermediate said pumps for admitting a fluid to the material and including a valve, and adjustable means for regulating the operation of said valve.

9. In a device of the class described, the combination of an inlet connection and an outlet connection, a pump line intermediate said connections, a pump in said pump line for causing a flow of a metered quantity of material from the inlet connection to the outlet connection, another pump in series with said first pump to receive the metered quantity of material from said first pump, means for so operating the pumps that the quantity of material flowing from the first pump is less than the capacity of the second pump, means intermediate said pumps for admitting a fluid to said material and including a valve housing having a valve seat therein intermediate the inlet and outlet of the valve housing, a valve member controlling fluid flow past said valve seat, and means controlling the operation of said valve member.

10. In a device of the class described, the combination of an inlet connection and an outlet connection, a pump line intermediate said connections, a pump in said pump line for causing a flow of a metered quantity of material from the inlet connection toward the outlet connection, another pump in said pump line operable at a higher rate of speed than a first pump and receiving a metered quantity of the material from said first pump whereby the receiving pump is starved, means intermediate said pumps for admitting a fluid to said material, and adjustable means for regulating the operation of said valve.

11. In a device of the class described, the combination of an inlet connection and an outlet connection, a pump line intermediate said connections, a pump in said pump line for causing a flow of a metered quantity of material from the inlet connection toward the outlet connection, another pump in said pump line operable at a higher rate of speed than the first pump and receiving a metered quantity of the material from said first pump whereby the receiving pump is starved, means intermediate said pumps for admitting a fluid to said material and including a valve housing having a valve seat therein intermediate the inlet and outlet of the housing, a valve member controlling the valve flow past said valve seat, and means regulating the operation of said valve member and including a pivotally mounted member having adjustable means thereon for regulating the movement of said valve member.

12. In a device of the class described, a delivery means, means supplying a metered quantity of material to said delivery means, means supplying a fluid to said delivery means in a quantity proportionate to the quantity of material supplied thereto, and means for operating said delivery means to intermingle said material and said fluid during passage thereof through said delivery means.

13. In a device of the class described, a pump, means supplying material to said pump in a quantity less than the capacity thereof, means supplying a fluid to said pump in a quantity proportionate to the quantity of material supplied thereto, and means for operating said pump to intermingle said material and fluid during passage thereof through said pump.

ARTHUR H. BOILEAU.